P. J. Manning,
Churn.

No. 95,124.  Patented Sep. 21, 1869.

Witnesses:  
William W. Berthel  
Robert Russ

Inventor:  
P. J. Manning

United States Patent Office.

PATRICK J. MANNING, OF TROY, ILLINOIS.

Letters Patent No. 95,124, dated September 21, 1869.

---

IMPROVEMENT IN CHURNS.

---

The Schedule referred to in these Letters Patent and making part of the same.

---

*To all whom it may concern:*

Be it known that I, PATRICK J. MANNING, of Troy, in the county of Madison, and State of Illinois, have made certain new and useful Improvements in Churns; and I do hereby declare that the following is a full and clear description thereof, reference being had to the accompanying drawings, and to the letters of reference marked thereon.

The object of this invention is to produce a churn cheap in its construction, and efficient in its action, easily cleaned, and easily operated.

The nature of this invention relates to the devices used to operate the dasher of a churn; and consists chiefly in the construction of a spirally-grooved rod, in such wise that a set of rollers in the frame attached to the top of the churn, may, in their action, revolve within said grooved rod and turn the same; said rod being furthermore connected, by a proper collar and pins, to the dasher, so that the whole, when operated up and down by means of a lever, may give a combined rotary and reciprocating motion to said dasher.

Figure 1:
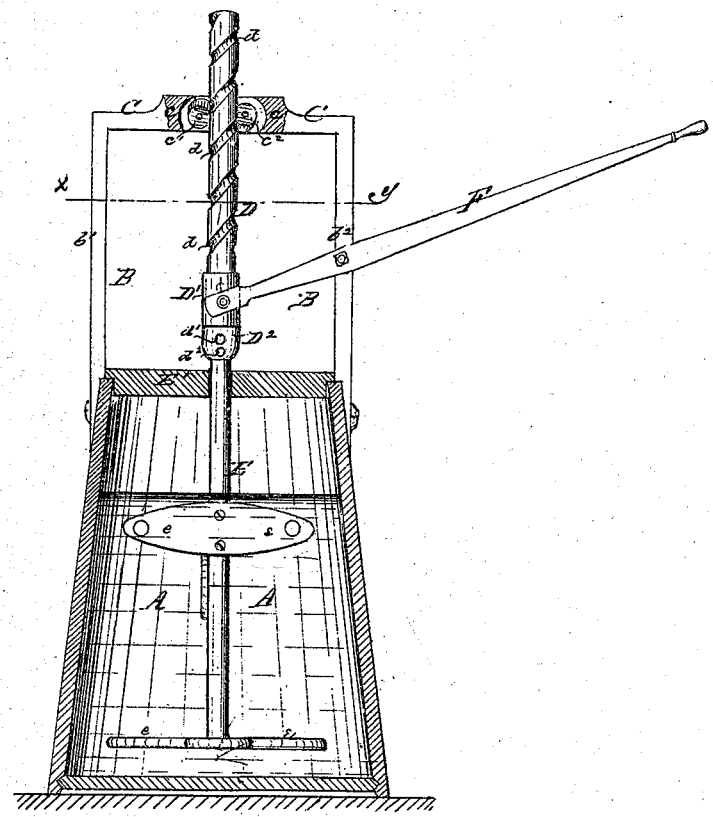
Figure 2:
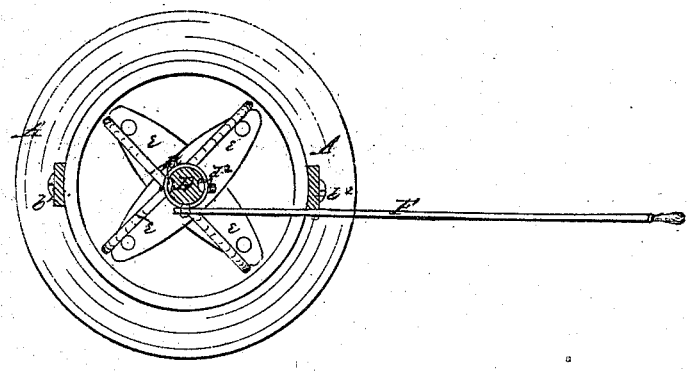

To enable those skilled herein to make and use my said improvement, I will now more fully describe the same, referring to Figure 1 as a sectional elevation, and to Figure 2 as a sectional top plan at line $x$–$y$, with the lid of the churn removed.

A represents the barrel of the churn, constructed in the ordinary manner.

At the top thereof, and properly secured to the sides of the churn, is the upright frame B, having side bars, $b^1$ and $b^2$, and being connected with transverse bar C, at the top.

Passing through the centre of said top bar C, the rod D, with its curved grooves $d$, (running screw line in form,) is guided.

At its lower end, said rod D is properly mortised, to allow it to pass through a hollow socket, $D^1$, and rest in the coupling socket $D^2$, with which it is secured by pin $d^1$.

The connection of said rod with the dasher-rod E, is then made, by the pin $d^2$ passing through the coupling socket $D^2$.

The dasher-rod is guided through the lid F' of the churn, and has at its lower end the cross-slats $e$, (or dashers,) with requisite perforations, as clearly shown in fig. 2.

To operate said dasher E, I attach, by proper screws or bolts, a hand-lever, F, to one of the side bars $b^2$ of the frame B, and extend the same to the hollow socket $D^1$, to which it is properly pivoted.

In order that the grooved rod D, when operated by the hand-lever, may give the required reciprocating motion to the churn-dasher E, as in the nature of this invention, I have arranged in the top bar of the frame, the inclined mortised slot $c$, in which, upon proper pins, the rollers $c^1$ and $c^2$ freely revolve.

Said rollers are so inclined that they revolve within the grooves $d$ of the rod D, causing the same to rotate.

It is thus evident that by the reciprocating motion of the dasher E, the butter globules in the milk will be effectively broken, and butter formed speedily.

This effective action is due to the combined reciprocating up-and-down motion of the dasher and its rotary movement, achieved as aforesaid.

By removing the pin $d^2$, the dasher may be readily disconnected from the rod D and cleansed; the dasher may then, also, be used to gather up the butter, in the ordinary manner.

Having thus fully described my invention,

What I claim, is—

The rod D, having spiral grooves, combined with the rollers $c^1$ $c^2$, the socket $D^1$, dasher-rod E, and dashers $e$, and actuated by the lever F, substantially as and for the purposes set forth.

In testimony of said invention, I have hereunto set my hand, in presence of—

P. J. MANNING.

Witnesses:
 GEO. P. HERTHEL, Jr.,
 WILLIAM W. HERTHEL.